Jan. 8, 1963  W. F. SAUNDERS III  3,072,841

TRANSISTOR NETWORK VOLTAGE REGULATOR

Filed Nov. 24, 1958

WILLIAM F. SAUNDERS III
INVENTOR

BY *Richard G. Stephens*

ATTORNEY

United States Patent Office 3,072,841
Patented Jan. 8, 1963

3,072,841
TRANSISTOR NETWORK VOLTAGE REGULATOR
William F. Saunders III, Wellesley, Mass., assignor to General Precision, Inc., a corporation of Delaware
Filed Nov. 24, 1958, Ser. No. 776,027
4 Claims. (Cl. 323—22)

My invention relates to voltage regulator circuits and in particular to transistor circuits for regulating the volt-ampere characteristic such as that of a direct-current voltage supply.

There are many purposes in the electrical field which require a voltage which shall always be of a constant value over a wide range of output current at all times. Since batteries, rectifiers and most other sources of direct current always have some resistance, it is necessary to provide a voltage regulator interposed between the source and the load-circuit terminals to attain this desired result.

My present invention is directed to a voltage regulator wherein an adjustable series resistor is connected between the source and the load circuit terminals. Although the adjustable series resistor may take various forms, such as an electronic tube, the invention is particularly suitable for an adjustable series resistor in the form of a line transistor. For this reason the invention will be described as applied to a voltage regulator employing a line transistor as an adjustable series resistor.

Transistors are quickly destroyed if subjected to an overload of current, and ordinary fuses and circuit breakers are too slow in action to protect them against such overloads if the load short-circuits. I have devised a network including auxiliary transistors which is capable of furnishing an output volt-ampere characteristic of such shape that the line transistor is never required to absorb a destructive amount of heat energy.

One object of my invention is accordingly to provide a novel type of output voltage regulator for direct-current voltage sources.

Another object is to provide an output network for voltage sources which acts with high rapidity to maintain output voltage constant at all times over a wide current range.

Another object is to provide a regulating line transistor of a voltage source with a shaping network which produces an output voltage characteristic which is substantially constant over a wide current range and which is of such shape when the curve passes beyond that range that the line transistor cannot absorb heat in a destructive amount.

Another object is to provide a line transistor of a voltage source with a shaping network which produces an output characteristic which is substantially constant in voltages over a range of current below a certain value and which exhibits a negative resistance when the characteristic curve has passed a predetermined point beyond that range.

Still another object is to provide a transistor network of novel form which, when supplied from a continuous voltage source, will give an output characteristic exhibiting zero resistance over a certain range and negative resistance over another range.

Yet another object is to provide a transistor network of novel form which, when supplied from a continuous voltage source, will give an output characteristic in one range of which there is no change of voltage when the current changes and in another range of which there is no change of current when the voltage changes.

The foregoing and other objects of my invention will be clearly evident after reading the following description taken in connection with the drawings in which.

Figure 1:
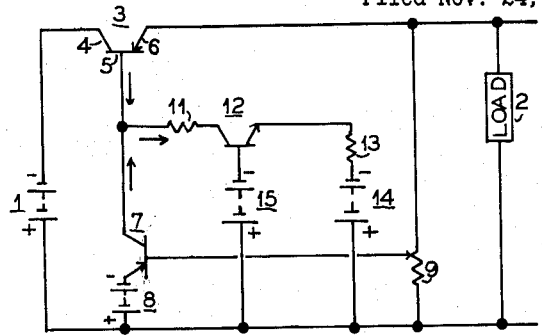
FIGURE 1 is a diagram in schematic form of one modification of my invention acting as a regulator for the voltage of a load supplied with current from a direct-current source.

Referring in detail to FIG. 1, a direct-current source 1, which may be subject to fluctuation from time to time, is connected in series with a load 2 on which it is desired to maintain voltage constant over a substantial range of current, through a transistor 3, which may be of the P-N-P type, and which comprises a collector 4, a base 5 and an emitter 6, collector 4 being connected to the negative terminal of source 1 and emitter 6 being connected to the load 2. The base 5 is connected to the collector of a second P-N-P type transistor 7 having its emitter connected to the negative pole of a direct-current source 8 whose positive pole is connected to the positive pole of source 1. The base of transistor 7 is connected to the movable contact of a potentiometer 9 which bridges the load 2.

The base 5 of transistor 3 is connected through a resistor 11 to the collector of an N-P-N transistor 12 having its emitter connected through a resistor 13 to the negative pole of a direct-current source 14 whose positive pole is connected to the positive pole of source 1. The base of transistor 12 is connected to the negative pole of a direct-current source 15 whose positive pole is connected to the positive pole of source 1. It will be noted that channels interconnecting the source 1 and load 2 form a three-terminal network.

The voltage of source 8 is of the value at which it is desired to maintain the voltage of load 2 constant over a wide current range. The voltage of sources 1 and 15 should each be greater than that of source 8, and the voltage of source 14 should be greater than that of source 15. The emitter current of transistor 12 is fixed at a constant value by the resistor 13 and the sources 14 and 15, and this sets an upper limit to the current that can flow through resistor 11 and the collector of transistor 12. When the current in load 2 is in the range at which load voltage is to be constant, the transistor 12 is arranged to operate in its saturated condition, and transistor 7 is in a conductive condition.

Figure 2:
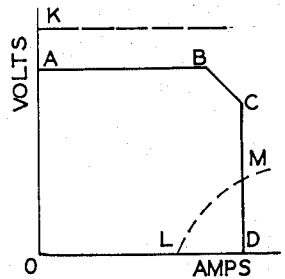
FIGURE 2 is a plot of the volt-ampere characteristic of a circuit of the FIGURE 1 type.

Turning to FIG. 2 in which voltage on load 2 is plotted as ordinates against load current, AB represents the voltage of load 2 on the working range in which it is desired to be held constant. AB falls below the value K of source 1 by the voltage drop through transistor 3. The circuit constants are so valued that substantial currents flow through transistor 12 from the base 5 of transistor 3, and from transistor 7 in the directions indicated by the arrows in FIG. 1. If now the voltage of load 2 decreases, the potential at the moving contact of potentiometer 9, and also that at the base of transistor 7, will become less negative, and the current flow in the collector of transistor 7 will decrease. The current through resistor 11 is constant since transistor 12 is saturated, so the current flowing downward from the base 5 of transistor 3 will increase. It may be noted that transistor 7 may be thought of as by-passing a portion of the current through resistor 11 which would otherwise flow from the base of transistor 3. The decrease of this current so by-passed by transistor 7 decreases the resistance from collector through emitter of transistor 3, thereby permitting more current to flow through transistor 3 from source 1 to load 2, and maintaining the voltage at load 2 substantially constant. In other words the system will be caused to operate at a point corresponding to larger current on the range A—B in FIG. 2.

When, however, the current in load 2 reaches a sufficiently high value, the current by-passed by transistor 7 will fall to zero (i.e., "cutoff"); and cannot thereafter divert exciting current which is flowing through resistor 11 from the base 5 and emitter 6 to cause a decrease in the resistance of transistor 3; consequently, the voltage at the terminal of load 2 will no longer be maintained near the value of curve range AB. In other words the system will begin to operate on range BC of FIG. 2.

As the load voltage decreases the current through the collector of transistor 12 will increase. However, a point C will soon be reached at which the collector current becomes equal to the emitter current of transistor 12 as determined by sources 14 and 15 and resistor 13. At that point the transistor 12 will draw substantially a constant current from base 5 and emitter 6 of transistor 3 and the current flowing through transistor 3 and load 2 will have the constant value (CD in FIG. 2) regardless of how much the load voltage departs from the value AB. It can be readily shown that if a transistor like 3 were to operate at various voltages and currents but a constant heat absorption, the points of its operation would, on a volt-ampere plot such as FIG. 2, form a rectangular hyperbola with its origin of coordinates at K as their locus. Curve LM is such a locus. For safe operation of the transistor 3 the points on the volt-ampere characteristic of the system should all lie between this locus and the volt axis.

Figure 3:
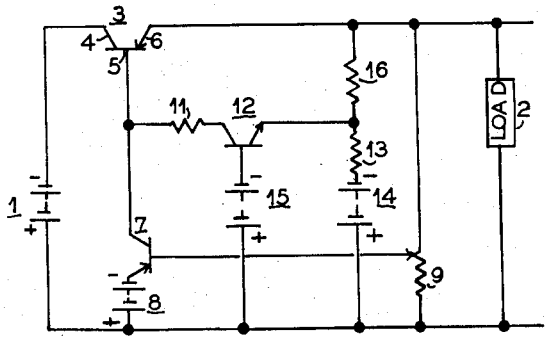
FIGURE 3 is a diagram in schematic form of another modification of my invention acting as a regulator for a load voltage supplied with current from a direct-current source.

Turning now to FIG. 3, it differs from the circuit of FIG. 1 in providing a connection which results in modifying the voltage at the emitter electrode of transistor 12 in response to variations of the load voltage whereas in the FIG. 1 circuit, the voltage of that emitter is unaffected by fluctuations in the load voltage. Thus, a resistor 16 connects the emitter of transistor 12 to the negative terminal of load 2 so that voltage fluctuations of the latter will be reflected into similar fluctuations in the emitter potential.

Figure 4:
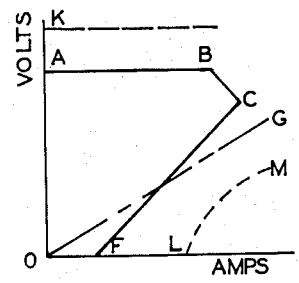
FIG. 4 is a plot of the volt-ampere characteristic of a FIG. 3 type circuit.

FIG. 4 shows the type of volt-ampere characteristic which results from this change in the circuits of the system. The portion ABC of the characteristic of the same form as that of FIG. 1. Beyond point C, however, the characteristic CF in FIG. 4 instead of being substantially vertical as in FIG. 2, is slanted backward and this acts as if the resistance of the transistor 3 were a negative one. This effect results from the fact that the emitter current, and so the collector current, of transistor 12 decreases when the load voltage falls along the range CF of the output characteristic. The slope of the line CF may be varied from zero to infinity by adjusting the resistances 13 and 16 and the voltages of sources 14 and 15.

It may be noted that the voltage of any resistive load 2 will be represented by a straight line such as OG passing through the original 0 of the volt and ampere coordinates, its slope being proportional to such resistance. The intersection of OG and CF represents the voltage and current at which the load of characteristic OG will be operated, and the single intersection shows that only one such voltage and current are possible for any given load of characteristic OG.

It will also be noted that the slope of line CF may be made such that it avoids intersection with the hyperbola LM which is the locus of maximum safe heating of line transistor 3, so that the system always operates in a region to the left of LM where overheating of transistor 3 cannot occur.

Figure 5:
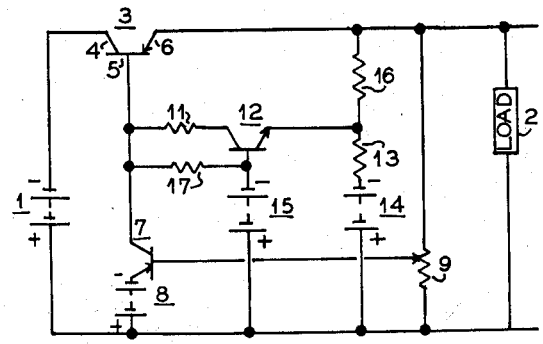
FIG. 5 is a diagram in schematic form of still another modification of my invention acting as a regulator for a load voltage supplied with current from a direct-current source.
Figure 6:
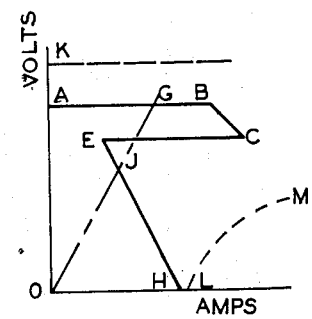
FIG. 6 is a plot of a volt-ampere characteristic derivable from a circuit of the FIG. 5 type.

By adding other branches containing transistors and resistors to the network feeding the base of line transistor 3 output characteristic curves of many different forms can be produced. For example, FIG. 5 shows a modification of the FIG. 3 network in which a resistor 17 has been added to interconnect the base electrodes of transistors 3 and 12. A volt-ampere characteristic of the shape shown in FIG. 6 results. Its portion ABCE is similar to the range ABCF of FIG. 4 with resistances 16 and 13 and voltage sources 15 and 14 properly adjusted. However, the remainder of the curve EH is different from either CD or CF shown in FIGS. 2 and 4. The line OG, representing the operating conditions for load 2, intersects the line ABCEH in three points, of which J and G represent stable operation. With such two stable operating points, two conditions of stable operation are possible for the system. Circuits having such a plurality of stable operating points have well known uses in the electrical field; for example, they have applications as two point memory devices, and the FIG. 5 circuit is useful for that purpose.

It may be pointed out that networks capable of producing voltage regulation and volt-ampere characteristic shaping similar to that described above are also obtained by reversing the polarity of all direct-current sources and substituting N-P-N transistors for all P-N-P transistors and P-N-P transistors for all N-P-N transistors.

Although the invention has been described with reference to certain specific embodiments thereof, numerous modifications falling within the spirit and scope of the invention are possible. Therefore, the foregoing description taken in conjunction with the drawings are to be construed in an illustrative sense and not in a limiting sense.

I claim as my invention:

1. A voltage regulator for supplying a load from a direct-current voltage source comprising a three terminal network, a P-N-P line transistor having its collector connected to one of said three terminals and its emitter connected to another of said three terminals, a first resistor connecting said emitter to the third of said three terminals, a second P-N-P transistor having its collector connected to the base of said line transistor and its emitter connected through a first direct current source to said third terminal, a connection between a point on said first resistor and the base of said second P-N-P transistor, an N-P-N transistor having its collector connected to the base of said line transistor through a second resistor and its emitter connected through a third resistor and a second direct-current source to said third terminal, a third direct-current source connected between the base of said N-P-N transistor and said third terminal, said N-P-N transistor operating in its saturated range when said load current is near the low-current end of its operating range, a fourth resistor being connected between the emitter of said line transistor and the emitter of said N-P-N transistor.

2. A voltage regulator for supplying a load from a direct-current voltage source comprising a three terminal network, a P-N-P line transistor having its collector connected to one of said three terminals and its emitter connected to another of said three terminals, a first resistor connecting said emitter to the third of said three terminals, a second P-N-P transistor having its collector connected to the base of said line transistor and its emitter connected through a first direct-current source to said third terminal, a connection between a point on said first resistor and the base of said second P-N-P transistor, an N-P-N transistor having its collector connected to the base of said line transistor through a second resistor and its emitter connected through a third resistor and a second direct-current source to said third terminal, a third direct-current source connected between the base of said N-P-N transistor and said third terminal, said N-P-N transistor operating in its saturated range when said load current is near the low-current end of its operating range, a fourth resistor being connected between the emitter of said line transistor and the emitter of said N-P-N transistor, a fifth resistor being connected between the base of said line transistor and the base of said N-P-N transistor.

3. In a three terminal network, a line transistor having its collector connected to one of said three terminals and its emitter connected to another of said three terminals, a first resistor connecting said emitter to the third of said three terminals, a second transistor having its collector connected to the base of said line transistor and its emitter connected through a first direct-current source to said third terminal, a connection between a point on said first resistor and the base of said second transistor, a third transistor having its collector connected to the base of said line transistor through a second resistor and its emitter connected through a third resistor and a second direct-current source to said third terminal, a third direct-current source connected between the base of said third transistor and said third terminal, and a fourth resistor connecting the emitter of said line transistor to the emitter of said third transistor.

4. The network specified in claim 3 with the addition of a fifth resistor connecting the base of said line transistor to the base of said third transistor.

References Cited in the file of this patent

UNITED STATES PATENTS

| | | |
|---|---|---|
| 2,697,811 | Deming | Dec. 21, 1954 |
| 2,776,382 | Jensen | Jan. 1, 1957 |
| 2,806,963 | Woll | Sept. 17, 1957 |
| 2,888,633 | Carter | May 26, 1959 |
| 2,897,432 | Jackson | July 28, 1959 |
| 2,904,742 | Chase | Sept. 15, 1959 |
| 2,932,783 | Mohler | Apr. 12, 1960 |

FOREIGN PATENTS

| | | |
|---|---|---|
| 1,129,336 | France | Sept. 3, 1956 |